United States Patent [19]

Kaufmann

[11] 4,180,502
[45] Dec. 25, 1979

[54] MANUFACTURE OF CONCENTRATED SOLUTIONS, HAVING A LOW SALT CONTENT, OF COBALT AND CHROMIUM 1:2 COMPLEX DYES WHICH ARE FREE FROM SULFONIC ACID GROUPS

[75] Inventor: Otto Kaufmann, Ludwigshafen, Fed. Rep. of Germany

[73] Assignee: BASF Aktiengesellschaft, Fed. Rep. of Germany

[21] Appl. No.: 947,586

[22] Filed: Oct. 2, 1978

Related U.S. Application Data

[63] Continuation of Ser. No. 811,464, Jun. 30, 1977, abandoned.

[30] Foreign Application Priority Data

Jul. 31, 1976 [DE] Fed. Rep. of Germany ....... 2634512

[51] Int. Cl.$^2$ .................. C09B 45/06; C09B 45/10; C09B 45/16; C09B 45/20
[52] U.S. Cl. .................. 260/145 A; 106/23; 106/288 Q; 106/308 N; 106/308 Q; 260/145 B; 260/146 R; 260/147; 260/148; 260/149; 260/150; 260/151
[58] Field of Search .......... 260/145 A, 145 B, 146 R, 260/146 D, 146 T, 147, 148, 149, 150, 151

[56] References Cited

U.S. PATENT DOCUMENTS

| | | | |
|---|---|---|---|
| 2,843,580 | 7/1958 | Straley et al. | 260/149 |
| 2,856,397 | 10/1958 | Pfitzner et al. | 260/151 |
| 2,933,488 | 4/1960 | Biedermann et al. | 260/151 X |
| 3,299,039 | 1/1967 | Moiso et al. | 260/151 X |

*Primary Examiner*—Floyd D. Higel
*Attorney, Agent, or Firm*—Keil & Witherspoon

[57] ABSTRACT

A process for the manufacture of concentrated solutions, having a low salt content, of o,o'-dihydroxy-or o,o'-dihydroxycarboxy-cobalt and -chrominum 1:2 complex dyes which are free from sulfonic acid groups, wherein the metallizing is carried out in water and a solvent of the formula I

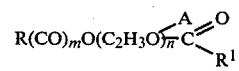

where X is hydrogen or methyl, m is 0 or 1, n is 1, 2 or 3 and R and R$^1$ independently of one another are hydrogen or alkyl of 1 to 4 carbon atoms, in the presence or absence of additional solvents, and in the presence of water-soluble salts.

9 Claims, No Drawings

MANUFACTURE OF CONCENTRATED SOLUTIONS, HAVING A LOW SALT CONTENT, OF COBALT AND CHROMIUM 1:2 COMPLEX DYES WHICH ARE FREE FROM SULFONIC ACID GROUPS

This is a continuation, of application Ser. No. 811,464 filed June 30, 1977, now abandoned.

The present invention relates to a process for the manufacture of concentrated solutions, which have a low salt content, of o,o'-dihydroxy- or o,o'-hydroxycarboxy-cobalt and -chromium 1:2 complex azo dyes which are free from sulfonic acid groups, wherein the metallizing is effected in water and a solvent of the formula I

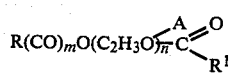

where A is hydrogen or methyl, m is 0 or 1, n is 1, 2 or 3 and R and $R^1$ independently of one another are hydrogen or alkyl of 1 to 4 carbon atoms, in the presence or absence of additional solvents, and in the presence of water-soluble salts.

Examples of solvents of the formula I are glycol esters, e.g. glycol acetate and glycol diacetate and, preferably, glycol-ether esters, in which the molecule contains both an ether group and an ester group. Examples of glycol-ether esters are the formates, acetates and propionates of mono-, di- or tri-ethylene glycol monomethyl, monoethyl, monopropyl and monobutyl ethers, and the corresponding propylene glycol derivatives.

Examples of individual compounds are $H_3COC_2H_4OCHO$, $H_5C_2OC_2H_4OCHO$, $H_3COC_2H_4OCOCH_3$, $H_5C_2OC_2H_4OCOCH_3$, $H_7C_3OC_2H_4OCOCH_3$, $H_9C_4OC_2H_4OCOCH_3$, $H_3COC_2H_4OCOC_2H_5$, $H_5C_2OC_2H_4OCOC_2H_5$, $H_9C_4OC_2H_4OCOC_2H_5$, $H_3C(OC_2H_4)_2OCOCH_3$, $H_3C(OC_2H_4)_3OCOCH_3$, $H_5C_2(OC_2H_4)_2OC_2H_5$, $H_9C_4(OC_2H_4)_2OCOCH_3$, $H_3COC_2H_4OCOC_3H_7$, $H_3COC_2H_4OCOC_4H_9$, $H_5C_2OC_2H_4OC_3H_7$ or $H_9C_4OC_2H_4OCOC_3H_7$ as well as the corresponding compounds with $-CH(CH_3)CH_2-$ in place of $C_2H_4$. It is preferable to use, e.g. $H_5C_2OC_2H_4OCOCH_3$ or $H_9C_4OC_2H_4OCOCH_3$. are $H_5C_2OC_2H_4OCOCH_3$ and $H_9C_4OC_2H_4OCOCH_3$.

Examples of further solvents which may be present during the metallizing are glycols, glycol monoethers and carboxylic acid amides, e.g. ethylene glycol, diethylene glycol, triethylene glycol, propylene glycol, dipropylene glycol, tripropylene glycol, mono-, di- and tri-ethylene glycol monomethyl, monoethyl, monopropyl and monobutyl ethers, mono-, di- and tri-propylene glycol monomethyl, monoethyl, monopropyl and monobutyl ethers, dimethylformamide, dimethylacetamide and N-methylpyrrolidone.

Examples of some preferred solvents are ethylene glycol, diethylene glycol, dipropylene glycol, ethylene glycol monoethyl ether and diethylene glycol mono-n-butyl ether.

Examples of water-soluble salts in the presence of which the metallizing may be effected are alkali metal salts and magnesium salts, e.g. magnesium chloride and, preferably, sodium chloride, sodium formate, sodium acetate, sodium propionate, potassium chloride and potassium acetate.

Cobalting is preferably carried out with cobalt-II hydroxide in a weakly acid to weakly alkaline range, preferably near the neutral point. Chroming can be carried out with chromium-VI compounds or preferably in organic solvents at elevated temperatures with chromium-III hydroxide in the presence of alkanoic acids and their salts, the actual chromium-III compound used being the reaction product, formed in situ, from chromium hydroxide, alkali metal hydroxide solution and excess alkanoic acid of 1 to 3 carbon atoms and the solvent used being a compound of the formula I

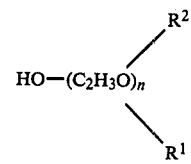

where $R^1$ is hydrogen or alkyl of 1 to 4 carbon atoms, $R^2$ is hydrogen or methyl and n is 1, 2 or 3, with or without addition of a carboxylic acid amide after the chroming.

Examples of suitable alkali metal hydroxides are lithium hydroxide, potassium hydroxide and, preferably, sodium hydroxide.

Alkanoic acids of 1 to 3 carbon atoms are formic acid, acetic acid and propionic acid and their substitution products, e.g. chloroacetic acid, though the unsubstituted acids are preferred.

If chromium-III hydroxide, acetic acid and sodium hydroxide are used, the reaction product formed in situ is probably a basic chromium-III acetate. The amount of acid is so chosen as to give a weakly acid pH, for example in the range from 3 to 6.

It is often advantageous to add a dicarboxylic acid or hydroxycarboxylic acid.

The metallization is advantageously carried out by heating the mixture of azo dye, solvent of the formula I (with or without other solvents), water, water-soluble salt and metallizing agent to the metallizing temperature. Since the solvents of the formula I and the aqueous salt solution mix incompletely, if at all, a two-phase system results. The aqueous phase takes up the salts while the complex dye formed is in the organic phase. After completion of the metallizing, the phases can be separated, giving a concentrated solution, of low salt content, of the metal complex dye in the organic medium.

A particularly preferred embodiment of the process according to the invention is to combine the diazotizing, coupling and metallizing of the azo dye or dyes into a one-vessel process by carrying out all process steps in the solvent mixture of the invention. In such a case, the diazotizing and coupling are carried out in the conventional manner. The fact that the solvents are present even during the diazotizing and coupling has the great advantage that the reaction can be carried out at much higher concentrations than is conventionally the case, and that furthermore, as a rule, the coupling reaction also gives better yields. The use of solvents which are incompletely miscible with water makes it possible to remove the salts introduced by diazotizing and coupling, in a very simple manner, after the metallizing, since they give rise to a two-phase system.

The solutions which may be manufactured in accordance with the invention as a rule contain from 10 to 40, preferably from 15 to 35, percent by weight of the 1:2 complex dye, from about 15 to 65, preferably from 20 to 45, percent by weight of solvent of the formula I, from 1 to 35, preferably from 10 to 30, percent by weight of other solvents, from 4 to 20, preferably from 8 to 16, percent by weight of water, and at times up to 15% of alkanoic acids which are introduced, for example, as a result of the process described above or as a result of hydrolysis of the compounds of the formula I.

The solutions manufactured according to the invention are stable on storage and may be used for the manufacture of dye liquors and print pastes for dyeing, in particular, nitrogen-containing fibers, e.g. wool, silk or nylons. They may furthermore be used for the manufacture of printing inks and wood stains, since, because of their generally very low salt content, they are miscible with most organic solvents, e.g. alcohols, glycols, ketones and esters.

In practice it may be necessary to standardize the concentration and shelf life of the solutions manufactured according to the invention. For this purpose, solvents already contained therein, or other solvents, may be added.

The dyes present in the solutions which may be manufactured according to the invention are, for example, the o,o'-dihydroxy- and o,o'-hydroxycarboxy-azo 1:2 metal complex compounds free from sulfonic acid groups which are disclosed in German Laid-Open Applications DOS Nos. 1,619,357 and 2,444,736 (see, in particular, the literature references on page 3 of the latter).

Details of the new process are to be found in the Examples which follow, in which parts and percentages are by weight, unless stated otherwise.

EXAMPLE 1

970 parts of a dye paste which contains 155 parts (0.5 mole) of the azo dye obtained from diazotized 1-amino-2-hydroxy-5-nitro-benzene→β-naphthol and 155 parts (0.5 mole) of the azo dye from diazotized 1-amino-2-hydroxy-4nitro-benzene→β-naphthol, are introduced into a mixture of 835 parts of ethylglycol acetate, 67 parts of 50 percent strength sodium hydroxide solution, 100 parts of acetic acid, 115 parts of water-wet chromium-III hydroxide containing 33% of $Cr_2O_3$, and 50 parts of sodium chloride. The mixture is then boiled for 10 hours under reflux (at about 105° C.). Thereafter it is cooled to room temperature and the impurities are removed by filtration. The lower, colorless layer is separated off. The upper layer is the concentrated stable stock solution having a low salt content. It dyes wool, nylon and leather in black hues.

Using a similar method, the azo dyes shown in the table may be employed to manufacture solutions of the corresponding 1:2 chromium complex dyes.

| Example No. | Hue |
|---|---|
| 2 | bright red |
| 3 | violet |
| 4 | blue |
| 5 | |

| Example No. | | Hue |
|---|---|---|
| 6 | [structure: O₂N-phenyl(OH)-N=N-naphthol with HN-CO-OCH₃ + phenyl(COOH)-N=N-C(HOC)=C(CCH₃)-N-N(phenyl-SO₂NH₂) pyrazolone] | green |
| 7 | [structure: OH, NO₂-phenyl-N=N-C(HOC)=C(CCH₃)-N-N(phenyl-SO₂NH₂) pyrazolone + OH-phenyl(SO₂NH₂)-N=N-naphthol with NH-CO-CH₃] | |

EXAMPLE 8

1,550 parts of dye paste containing 322 parts (1.0 mole) of the azo dye obtained from diazotized 1-aminobenzene-2-carboxylic acid and 1-phenyl-3-methyl-5-pyrazolone, are introduced into a mixture of 830 parts of ethylglycol acetate, 107 parts of 50 percent strength sodium hydroxide solution, 152 parts of acetic acid, 115 parts of water-moist chromium-III hydroxide containing 33% of $Cr_2O_3$, and 40 parts of sodium chloride. The mixture is then boiled for 12 hours under reflux (at about 105° C.). It is then cooled to room temperature and impurities are filtered off. The filtrate consists of two liquid phases. The upper phase is the aqueous, colorless, salt-rich layer. The lower layer is separated off and, after adding 60 parts of ethylene glycol, constitutes the concentrated, stable stock solution of low salt content. It dyes wool, nylon and leather in yellow hues.

EXAMPLE 9

400 parts of a dye paste which contains 132 parts (0.41 mole) of the azo dye obtained from diazotized 1-aminobenzene-2-carboxylic acid and 1-phenyl-3-methyl-5-pyrazolone, and 600 parts of a dye paste which contains 200 parts (0.59 mole) of the azo dye obtained from diazotized 1-amino-2-hydroxy-5-nitro-benzene and 1-phenyl-3-methyl-5-pyrazolone, are introduced into a mixture of 930 parts of ethylglycol acetate, 107 parts of 50 percent strength sodium hydroxide solution, 152 parts of acetic acid, 14 parts of crystalline oxalic acid, 115 parts of water-wet chromium-III hydroxide containing 33% of $Cr_2O_3$, and 40 parts of sodium chloride. The mixture is then boiled for 6 hours under reflux (at about 105° C.). Thereafter it is cooled to room temperature and impurities are filtered off. The filtrate consists of two liquid phases. The lower, colorless, salt-rich, aqueous phase is separated off. The upper phase, after addition of 60 parts of ethylene glycol monoethyl ether, constitutes the concentrated, stable stock solution having a low salt content. It dyes wool, nylon and leather in orange hues.

EXAMPLE 10

950 parts of a dye paste which contains 339 parts (1.0 mole) of the azo dye obtained from diazotized 1-amino-2-hydroxy-4-nitrobenzene and 1-phenyl-3-methyl-5-pyrazolone, are introduced into a mixture of 830 parts of ethylglycol acetate, 107 parts of 50 percent strength sodium hydroxide solution, 185 parts of propionic acid, 14 parts of crystalline oxalic acid, 115 parts of water-wet chromium-III hydroxide containing 33% of $Cr_2O_3$, and 40 parts of sodium chloride. The mixture is then boiled for 10 hours under reflux (at about 105° C.). Thereafter it is cooled to room temperature and impurities are filtered off. The filtrate consists of two liquid phases. The upper is the aqueous, colorless, salt-rich phase. The lower phase is separated off and after addition of 60 parts of diethylene glycol mono-n-butyl ether constitutes the concentrated, stable stock solution having a low salt content. It dyes wool, nylon and leather in red hues.

EXAMPLE 11

A mixture of 835 parts of ethylglycol acetate (ethylene glycol monoethyl ether acetate), 80 parts of 1-amino-2-hydroxy-4-nitrobenzene, 74 parts of 1-amino-2-hydroxy-5-nitro-benzene and 142 parts of 30 percent strength hydrochloric acid is heated to 70° C. and then cooled to 0°–5° C. A solution of 69 parts of $NaNO_2$ and 260 parts of water is run into the above solution at 0°–5° C. in the course of about 1 hour, whilst stirring. The mixture is then stirred further for about 1 hour at 0°–5° C., and 154 parts of β-naphthol are then introduced, followed by 80 parts of 50 percent strength sodium hydroxide solution run in over 1 hour at 0°–5° C. After stirring for one hour, a further 40 parts of 50 percent strength sodium hydroxide solution are added over 1 hour. The mixture is then stirred for a further 20 hours, 27 parts of 85 percent strength formic acid and 115 parts of water-wet chromium-III hydroxide containing 33% and $Cr_2O_3$ are added, and the batch is boiled for 7 hours under reflux (about about 103° C.). After cooling to room temperature, the small amount of precipitated matter is filtered off. The filtrate consists of two liquid layers. The lower, colorless, salt-rich, aqueous layer is separated off. The upper layer constitutes the concentrated, stable stock solution having a low salt content. It dyes wool, nylon and leather in black hues.

EXAMPLE 12

A mixture of 625 parts of ethylene glycol acetate (ethylene glycol monoethyl ether acetate), 210 parts of ethylglycol (ethylene glycol monoethyl ether), 80 parts of 1-amino-2-hydroxy-4-nitro-benzene, 74 parts of 1-amino-2-hydroxy-5-nitro-benzene and 142 parts of 30 percent strength hydrochloric acid is heated to 70° C. and then cooled to 0°–5° C. A solution of 69 parts of $NaNO_2$ and 260 parts of water is run into the above solution at 0°–5° C. in the course of about 1 hour, whilst stirring. The mixture is then stirred further for about 1 hour at 0°–5° C. and 8 parts of amidosulfonic acid are then introduced. The batch is stirred for a further hour at 0°–5° C. 154 parts of β-naphthol are then introduced, followed by 87 parts of 50 percent strength sodium hydroxide solution added over 1 hour, and after stirring for one hour a further 45 parts of 50 percent strength sodium hydroxide solution are added. The mixture is then stirred for 20 hours, 150 parts of acetic acid and 115 parts of water-wet chromium-III hydroxide containing 33% of $Cr_2O_3$ are added, and the batch is boiled for 7 hours under reflux (at about 103° C.). After cooling to room temperature, the small amount of precipitated matter is filtered off. The filtrate consists of two liquid layers. The lower, colorless, salt-rich, aqueous layer is separated off. The upper layer, after addition of 67 parts of ethylene glycol, constitutes the concentrated, stable stock solution having a low salt content. It dyes wool, nylon and leather in black hues.

If instead of the 210 parts of ethylglycol, 210 parts of ethylene glycol are used, a stock solution with similar properties is obtained.

EXAMPLE 13

A mixture of 625 parts of ethylglycol acetate, 210 parts of ethylglycol, 80 parts of 1-amino-2-hydroxy-4-nitro-benzene, 74 parts of 1-amino-2-hydroxy-5-nitro-benzene and 142 parts of 30 percent strength hydrochloric acid is stirred for 6 hours at room temperature. A solution of 69 parts of $NaNO_2$ and 260 parts of water is then run over about 1 hour into the above mixture at 0°–5° C. The batch is further stirred for about 1 hour at 0°–5° C. and 154 parts of β-naphthol are then introduced, followed by 89 parts of 50 percent strength sodium hydroxide solution added over 1 hour at 0°–5° C. After stirring for one hour, a further 44 parts of 50 percent strength sodium hydroxide solution are added over 1 hour. The mixture is then stirred for 20 hours, 185 parts of propionic acid and 115 parts of water-wet chromium-III hydroxide containing 33% of $Cr_2O_3$ are added and the batch is boiled for 7 hours under reflux (at about 103° C.). After cooling to room temperature, the small amount of precipitated matter is filtered off. The filtrate consists of two liquid layers. The lower, colorless, salt-rich, aqueous layer is separated off. The upper layer, after addition of 67 parts of ethylene glycol, constitutes the concentrated, stable stock solution having a low salt content. It dyes wool, nylon and leather in black hues.

EXAMPLE 14

A solution of 69 parts of $NaNO_2$ in 260 parts of water is added over 30 minutes to a mixture of 415 parts of ethyglycol acetate, 415 parts of ethylglycol, 137 parts of 1-amino-2-carboxybenzene and 130 parts of 30 percent strength hydrochloric acid at 0° C. After stirring for one hour at 0° C., 6 parts of amidosulfonic acid are added, the mixture is stirred for a further 30 minutes at 0° C., 179 parts of 1-phenyl-3-methyl-5-pyrazolone are introduced and 40 parts of 50 percent strength sodium hydroxide solution are then added over 30 minutes at 0° C. The batch is then stirred for 10 hours at room temperature, 45 parts of 85 percent strength formic acid, 69 parts of anhydrous sodium acetate and 115 parts of water-wet chromium-III hydroxide containing 33% of $Cr_2O_3$ are introduced and the batch is boiled for 10 hours under reflux (at about 103° C.). 67 parts of 50 percent strength sodium hydroxide solution and 17 parts of sodium chloride are then added. The small amount of precipitated matter is filtered off at room temperature. The lower, colorless, aqueous layer is separated off. The upper layer, after adding 100 parts of ethylglycol, constitutes the concentrated, stable stock solution having a low salt content. It dyes wool, nylon and leather in yellow hues.

EXAMPLE 15

A mixture of 415 parts of ethylglycol acetate, 415 parts of ethylglycol, 154 parts of 1-amino-2-hydroxy-4-nitro-benzene and 142 parts of 30 percent strength hydrochloric acid is stirred for 6 hours at room temperature. A solution of 69 parts of $NaNO_2$ in 260 parts of water is then run in over about 1 hour at 0°–5° C. The batch is stirred for a further hour at 0°–5° C. 6 parts of amidosulfonic acid are then introduced, the mixture is stirred for 30 minutes and 179 parts of 1-phenyl-3-methylpyrazolone and 40 parts of 50 percent strength sodium hydroxide solution are then added over 30 minutes. After stirring for two hours at 0°–5° C., 83 parts of acetic acid, 69 parts of anhydrous sodium acetate and 115 parts of 115 parts of water-wet chromium-III hydroxide containing 33% of $Cr_2O_3$ are added. The mixture is boiled for 10 hours under reflux (at about 103° C.). After it has cooled to room temperature, the small amount of precipitated matter is filtered off. The filtrate consists of two liquid layers. The lower, colorless, salt-rich, aqueous layer is separated off. The upper layer, after adding 67 parts of ethylene glycol, constitutes the concentrated, stable stock solution having a low salt content. It dyes wool, nylon and leather in red hues.

Using a similar method, the dyes in the table can be used to manufacture solutions of other 1:2 chromium complex dyes and chromium mixed complex dyes.

| Example No. | Dye | Hue |
| --- | --- | --- |
| 16 | 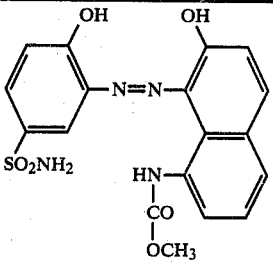 | bluish grey |
| 7 | 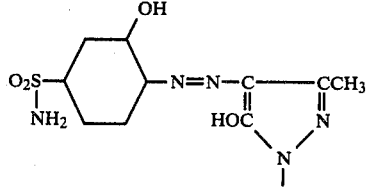 | bright red |
| 18 | 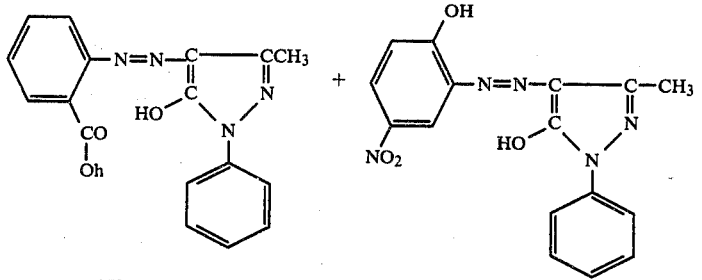 | orange |
| 19 | 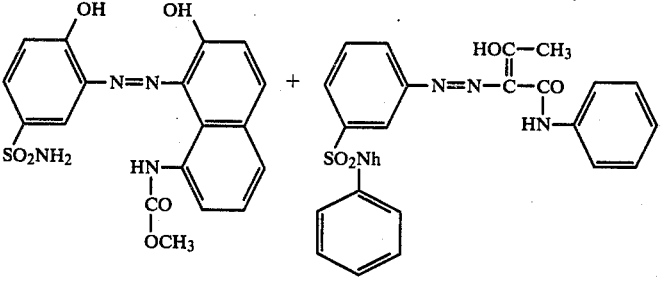 | olive |
| 20 | 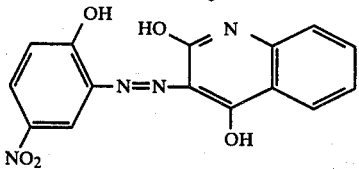 | red |

EXAMPLE 21

A mixture of 625 parts of ethylglycol acetate, 210 parts of ethylglycol, 188 parts of 1-amino-2-hydroxy-5-sulfamidobenzene and 142 parts of 30 percent strength hydrochloric acid is heated to 70° C. and then cooled to 0°–5° C. A solution of 69 parts of NaNO₂ in 260 parts of water is run into this mixture at 0°–5° C. over about 1 hour, whilst stirring. The batch is stirred for a further hour at 0°–5° C. and 8 parts of amidosulfonic acid are then introduced. Stirring is continued for an hour at 0°–5° C. and 188 parts of acetoacetic acid anilide are then introduced, followed by 152 parts of 80 percent strength sodium hydroxide solution added over 1 hour. The mixture is then stirred for a further 2 hours, 125 parts of water-wet cobalt-II hydroxide containing 25% of cobalt are added and the batch is boiled for 3 hours under reflux (at about 103° C.). After it has cooled to room temperature, the small amount of precipitated matter is filtered off. The filtrate consists of two liquid layers. The lower, colorless, salt-rich, aqueous layer is separated off. The upper layer constitutes the concentrated, stable stock solution having a low salt content. It dyes wool, nylon and leather in yellow hues.

Using a similar method, the dyes in the table can be used to manufacture solutions of other 1:2 cobalt complex dyes.

| Ex. No. | Dye | Hue |
|---|---|---|
| 22 | (structure) | violet |
| 23 | (structure) | dull bluish-red |
| 24 | (structure) | bluish violet |
| 25 | (structure) | yellow |

EXAMPLE 26

The following two reaction mixtures I and II are prepared by diazotizing and coupling in a solvent mixture of butyldiglycol (diethylene glycol mono-n-butyl ether) or ethylglycol and ethylglycol acetate:
Reaction mixture I:

A mixture of 415 parts of butyldiglycol, 415 parts of ethylglycol acetate, 154 parts of 1-amino-2-hydroxy-5-nitrobenzene and 142 parts of 30 percent strength hydrochloric acid is stirred for 6 hours at room temperature. A solution of 69 parts of NaNO$_2$ in 260 parts of water is run into this mixture at 0°–5° C. over about one hour, whilst stirring. Stirring is continued for 1 hour at 0°–5° C., 6 parts of amidosulfonic acid are introduced, the mixture is stirred for a further 30 minutes, 179 parts of 1-phenyl-3-methyl-5-pyrazolone are then added, followed by 40 parts of 50 percent strength sodium hydroxide solution added over 30 minutes at 0°–5° C., and the batch is stirred for a further 2 hours.
Reaction mixture II:

A mixture of 415 parts of ethylglycol, 415 parts of ethylglycol acetate, 154 parts of 1-amino-2-hydroxy-4-nitrobenzene and 142 parts of 30 percent strength hydrochloric acid is stirred for 6 hours at room temperature. A solution of 69 parts of NaNO$_2$ in 260 parts of water is run into this mixture at 0°–5° C. over about 1 hour, whilst stirring. Stirring is continued for 1 hour at 0°–5° C., 6 parts of amidosulfonic acid are introduced, the mixture is stirred for a further 30 minutes, 154 parts of β-naphthol are then added followed by 120 parts of 50 percent strength sodium hydroxide solution introduced over 1 hour at 0°–5° C., and the batch is then stirred for 15 hours at room temperature.

The reaction mixtures I and II are mixed, 230 parts of aqueous cobalt-II hydroxide paste containing 27% of cobalt are added and the batch is heated for 1 hour under reflux (at about 103° C.). After it has cooled to room temperature, the small amount of precipitated matter is filtered off. The filtrate consists of two layers. The lower, colorless, salt-rich, aqueous layer is separated off. The upper layer constitutes the concentrated, stable stock solution having a low salt content. It dyes wool, nylon and leather in brown hues.

I claim:

1. A process for the manufacture of a solution, which has a low salt content, of a sulfonic acid group-free o,o'-dihydroxy- or o,o'-hydroxycarboxy-azo dye cobalt or chromium 1:2 complex, which process comprises:
    metallizing the azo dye with a metallizing agent to complex said dye with chromium or cobalt, the metallizing being carried out in water and a solvent consisting essentially of an organic compound of the formula:

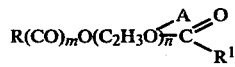      I in which A is hydrogen or methyl, m is zero or 1, n is an integer of from 1 to 3 and R and R$^1$ are, each independently, hydrogen or alkyl of 1 to 4 carbon atoms, and in the presence of at least one water-soluble salt selected from the group consisting of alkali metal and magnesium salts, and
    separating the resulting two-phase system whereby the aqueous phase takes up the salts while the organic phase results in a concentrated solution, of low salt content, of the metal complex dye.

2. A process as set forth in claim 1 in which the compound of the formula I has the formula:

wherein R and R$^1$ have the above meanings.

3. A process as set forth in claim 1 in which the solvent comprises one or more of ethylene glycol, diethylene glycol, dipropylene glycol or an ethylene glycol alkyl monoether, where alkyl is of 1 to 4 carbon atoms, in addition to a compound of formula I.

4. A process as set forth in claim 1 in which sodium chloride, sodium formate, sodium acetate or sodium propionate is used as the water-soluble salt.

5. A process as set forth in claim 1 in which the material metallized is a reaction mixture obtained from the manufacture of the azo dye by diazotizing and coupling in the presence of the solvent defined in claim 1.

6. A process as set forth in claim 1, wherein said compound of the formula I is H$_5$C$_2$OC$_2$H$_4$OCOCH$_3$.

7. A process as set forth in claim 1, wherein said compound of the formula I is H$_9$C$_4$OC$_2$H$_4$OCOCH$_3$.

8. A process as set forth in claim 1, wherein the water-soluble salts are selected from the group consisting of sodium chloride, sodium acetate, sodium propionate, potassium chloride and potassium acetate.

9. A process as set forth in claim 1, wherein the metallizing is carried out by heating the mixture of azo dye, solvent of the formula I, water, water-soluble salt and metallizing agent to the metallizing temperature.

* * * * *

UNITED STATES PATENT AND TRADEMARK OFFICE
CERTIFICATE OF CORRECTION

PATENT NO. : 4,180,502
DATED : December 25, 1979
INVENTOR(S) : KAUFMANN ET AL.

It is certified that error appears in the above—identified patent and that said Letters Patent is hereby corrected as shown below:

In the Abstract, line 8, change "X" to --A--.

Signed and Sealed this

Twenty-sixth Day of August 1980

[SEAL]

Attest:

SIDNEY A. DIAMOND

Attesting Officer     Commissioner of Patents and Trademarks